United States Patent
Wild et al.

(10) Patent No.: US 10,531,760 B2
(45) Date of Patent: Jan. 14, 2020

(54) METHOD AND APPARATUS FOR GREASE SEPARATION DURING A COOKING CYCLE

(71) Applicants: Hannes Wild, Riegsee (DE); Guenter Wurdinger, Peissenberg (DE)

(72) Inventors: Hannes Wild, Riegsee (DE); Guenter Wurdinger, Peissenberg (DE)

(73) Assignee: CONVOTHERM ELEKTROGERATE GMBH, Eglfing (DE)

(*) Notice: Subject to any disclaimer, the term of this patent is extended or adjusted under 35 U.S.C. 154(b) by 40 days.

(21) Appl. No.: 14/873,695

(22) Filed: Oct. 2, 2015

(65) Prior Publication Data

US 2016/0198884 A1 Jul. 14, 2016

Related U.S. Application Data

(60) Provisional application No. 62/059,374, filed on Oct. 3, 2014.

(51) Int. Cl.
*A47J 36/32* (2006.01)
*A47J 27/58* (2006.01)

(52) U.S. Cl.
CPC .............. *A47J 27/58* (2013.01); *A47J 36/32* (2013.01)

(58) Field of Classification Search
CPC .......... F24C 15/327; A47J 36/32; A47J 37/12; A47J 37/1228; A47J 37/1266; A47J 37/1271; B01D 17/0208; B01D 17/0211; B01D 17/0214; B01D 2221/02; C02F 1/40; C02F 2209/42

USPC ......... 99/444, 375, 400, 446, 325, 330, 342, 99/403, 407; 210/187, 104, 744, 776, 86, 210/242.1, 538, 540; 340/612
See application file for complete search history.

(56) References Cited

U.S. PATENT DOCUMENTS

| 3,935,741 | A | * | 2/1976 | Zinsmeyer | G01F 23/68 33/716 |
| 6,413,435 | B1 | * | 7/2002 | Kyles | B01D 21/0042 210/800 |
| 7,421,942 | B2 | | 9/2008 | Hansen et al. | |

(Continued)

FOREIGN PATENT DOCUMENTS

| EP | 1529183 A1 | 5/2005 | |
| WO | WO-2013013684 A1 * | 1/2013 | ........ F24C 15/007 |

*Primary Examiner* — Dana Ross
*Assistant Examiner* — Joseph M Baillargeon
(74) *Attorney, Agent, or Firm* — Ohlandt, Greeley, Ruggiero & Perle, LLP (57) ABSTRACT

Disclosed are methods and apparatuses for grease separation during a cooking cycle of a food product in a cooking device. The methods and apparatuses perform grease separation by bifurcating the cooking cycle. In a first portion of the cooking cycle, in which the system is closed to ingress of the atmosphere by creating a water barrier in a collector box to seal a cooking chamber in which the food product is cooking, all cooking fluids exiting the cooking device pass into the water barrier. In a second portion of the cooking cycle, the collector box is emptied and the system is opened to capture all cooking fluids exiting the cooking device in the collector box. During the open portion, a grease/cooking fluid interface is monitored and the captured cooking fluids, containing a high percentage of grease, are pumped out of the collector box.

7 Claims, 9 Drawing Sheets

(56) References Cited

U.S. PATENT DOCUMENTS

2005/0236307 A1* 10/2005 Mazurek ............ B01D 17/0214
                                                    210/86
2013/0032041 A1   2/2013 Kramer et al.
2013/0133638 A1   5/2013 Kulakowski et al.
2014/0290500 A1* 10/2014 Wurdinger .......... F24C 15/2007
                                                    99/403

* cited by examiner

METHOD AND APPARATUS FOR GREASE SEPARATION DURING A COOKING CYCLE

CROSS-REFERENCED APPLICATION

This application is related, and claims priority, to U.S. Provisional Application No. 62/059,374 filed on Oct. 3, 2014 which is incorporated herein in its entirety by reference thereto.

BACKGROUND

1. Field of the Disclosure

The present disclosure relates to methods and apparatuses for grease separation from other liquids during a cooking cycle. More specifically, the present disclosure relates to methods and apparatuses for grease separation during the cooking cycle, in which the system is "closed" during a first portion of the cooking cycle but is "open" during a second portion of the cooking cycle to separate the grease from other liquids generated by the cooking food product.

2. Description of the Background Art

Some food products when cooked produce significant quantities of grease, especially at certain portions of a cooking cycle, depending on the food product and cooking cycle. The grease may be allowed to drain away from the cooking food product, but the grease presents several problems. The grease may combine with other fluids generated during the cooking cycle and cause the cooking device to become soiled in areas that may be difficult to clean, leading to maintenance and repair issues. The grease likewise may combine with other cooking fluids generated during the cooking cycle, and interfere with the disposal of those other fluids. The other fluids (food juices and water) are generally safe to dispose of directly into public waste disposal systems, but grease presents problems with disposal into public systems, including contamination and/or clogging. Several attempts have been made to develop cooking systems that provide for the grease to be separately collected so as to not combine, and interfere, with the disposal of other fluids that are generated during a cooking cycle.

U.S. Pat. No. 7,421,942 discloses a grease collection system that may be connected to a cooking device such as a cooking oven for the real-time removal of grease from the heating chamber while maintaining a closed system. In particular, one end of a grease removal conduit is placed in communication with a drain in the cooking chamber, and the other end of the grease removal conduit is placed in a portable reservoir for the disposal of grease in which the reservoir has a predetermined fluid level to prevent ambient air from entering the heating chamber during the preparation of cooked food product. In this patent, the grease collection system operates during the entire cooking cycle and, generally, provides for a grease collection chamber that is disposed beneath the oven. In addition to not separating grease from other cooking fluids, this configuration precludes an efficient stacking of cooking ovens, one above the other.

EP Patent No. 1529183 discloses system that includes a cooking device that removes fat physically from the atmosphere in the cooking chamber of the cooking device. This system does not separate fluids that emanate from cooking food products and drain from the cooking chamber of the cooking device.

U.S. Patent Publication No. 2013/0032041 discloses a grease collection system that includes a grease drain disposed in a sidewall of the cooking chamber of the cooking device. The collection occurs during the entire cooking cycle, and no attempt is made to separate grease from of the other cooking fluids emanating from the cooking food product. In addition, the cooking device requires the use of a drip pan in the interior of the cooking chamber in order to accumulate fluids from cooking food product, including any grease produced.

U.S. Patent Publication No. 2013/0133638 discloses a grease removal system for a closed-system combination oven in which excess grease is conducted to a water-filled condenser through the same drain pipe as steam inside the cooking chamber. There is a gap at the end of the drain pipe above the surface of the water-filled condenser. The successful function sought by this disclosure is based on a presumption that the grease will fall by gravity through the drain into the portion of the condenser that is formed into a separate reservoir by a wall in the condenser. By this configuration, the disclosure thereby segregates grease from steam and other fluids. According to this disclosure, the steam and other fluids are forced to pass through a water reservoir by way of a baffle system. The steam and other fluids from the cooking chamber are said to separate from the grease solely due to the concept that the steam will not remain with the grease, and vice versa. The steam presumptively is forced through the water-filled reservoir, while the grease alone is said to be collected in the separate reservoir. The design and construction of the disclosed grease removal system is generally complex. A potential problem with the disclosed system is that it assumes that all of the steam from the cooking chamber passes through the water reservoir while all of the grease is collected in the separate reservoir. If the grease and steam do not "separate" as they pass down the drain under pressure from the cooking chamber, but rather remain combined, substantial contamination of the collected grease with water from the steam and substantial contamination of the steam with grease passing through the water-filled reservoir will occur. This would lead to loss of efficiency and loss of grease removal. Tests have shown that the presumption that the grease and steam efficiently separate in the drain is incorrect and the problem of contamination of grease with water and vice versa does indeed occur.

SUMMARY OF THE DISCLOSURE

It is, therefore, an object of the present disclosure to provide methods and apparatuses for the removal of grease from a cooking device that are simpler in design and construction than the disclosed systems.

It is also an object of the present disclosure to provide methods and apparatuses for the removal of grease from a cooking device that are more efficient than the disclosed systems.

It is a further object of the present disclosure to provide methods and apparatuses for the removal of grease from a cooking device by direct measurement of the amount of grease collected and responding to that measurement.

It is a still further object of the present disclosure to provide methods and apparatuses for the removal of grease from a cooking device that can remove grease from a cooking device on a real-time basis.

It is also an object of the present disclosure to provide methods and apparatuses for the removal of grease from a cooking device that are flexible and can be adapted to any cooking food product by a user.

The above and other objects are met by the methods and apparatuses of the present disclosure.

The cooking device of the present disclosure itself is of general, known design. In general, the disclosure concerns a cooking device, in particular a commercial cooking device (such as a combisteamer, a baking oven or a steam-assisted microwave oven) comprising: a housing including a cooking chamber, a door for opening and closing the cooking chamber, and a drain having an opening for allowing cooking fluids/grease to drain from the cooking device. Associated with the drain opening is a drain pipe having two ends, one end disposed in a collector box having a bottom and a plurality of walls to form a volume.

At a first portion of a cooking cycle during which little or no grease will emanate from the cooking food product, the volume of the collector box is filled with water at the start of a cooking cycle to provide a water level in contact with (or at a level above) the end of the drain pipe disposed in the collector box during a first portion of the cooking cycle. This water level seals the end of the drain pipe disposed in the collector box and provides a "closed" system because there is no external atmosphere entering the cooking chamber. Associated and in communication with the collector box is a plurality of collector box drains, including a lower collector box drain disposed at or near the bottom of the collector box and an upper collector box drain disposed above the water level. The lower collector box drain and upper collector box drain are each associated with a drain line. One or more pumps is/are associated with the drain line of each of the upper collector box drain line and lower collector box drain line.

At a second portion of the cooking cycle during which grease will emanate from the cooking food product at a more rapid rate, the "closed" system is converted to an "open" system by lowering the water level to below the end of the drain pipe disposed in the collector box such that the seal provided by the water level in contact with the end of the drain pipe is broken. Lowering the water level and breaking the seal is done by activating the pump associated with the lower collector box drain line to remove the water (and cooking fluids) from the collector box through the drain line associated with the lower collector box drain. Thereafter, the pump associated with the lower collector box drain line is de-activated. Thereafter, primarily grease emanating from the cooking food product will be collected in the collector box. Associated with a wall of the collector box on either the outside or inside thereof, preferably on the outside, is at least one sensor. In one embodiment of the present disclosure, disposed inside the collector box is at least one float that is designed to indicate various levels of fluid in the collector box, including the surface of the grease, or the interface or boundary of the line of separation between grease and other fluids draining into the collector box, and/or both the surface of the grease and the interface between grease and other fluids draining into the collector box. As will be discussed in more detail in relation to the Figures, different floats having characteristics that respond to different viscosities/densities may be used to indicate various levels of fluid in the collector box. For example, as the float indicating the interface between grease and other fluids rises along with the rising level of the interface, the sensor detects the float when it rises to a certain level and activates the pump associated with the upper collector box drain line. The upper collector box drain line is disposed at least at, and preferably below, the end of the drain pipe disposed in the collector box, preferably at a level just above the sensor. The activation of the pump associated with the upper collector box drain line removes grease from the collector box through the upper collector box drain. This removes primarily, preferably substantially, grease from the collector box. The pump associated with the upper collector box drain line may be continually operated for the duration of the cooking cycle, or may be "pulsed" at time intervals to allow for further collection of grease in cycles. The operation of the pump associated with the upper collector box drain line either continually or in cycles is continued/repeated until the cooking of the food product is finished. Thereafter, water is added to the collector box to again seal the end of the drain pipe disposed in the collector box, and the process can be repeated.

One embodiment of the present disclosure provides an apparatus for grease separation during a cooking cycle in a cooking device, in particular a commercial cooking device (such as, preferably, a combisteamer, a baking oven or a microwave oven) comprising a housing including a cooking chamber, a door for opening and closing the cooking chamber, and a drain disposed in the cooking chamber and having an opening for allowing cooking fluids/grease to drain from the cooking chamber, the apparatus comprising: a collector box having a bottom and a plurality of walls having a height disposed away from the bottom to form a collector box volume; a drain pipe having a first end and a second end, wherein the first end is disposed in association with the drain in communication with the cooking chamber, wherein the second end is disposed away from the first end and the cooking chamber and in communication with the collector box volume, wherein the collector box volume contains a quantity of water providing a water level sufficient to contact and seal the second end; a plurality of collector box drains in communication with the collector box volume, wherein at least a lower collector box drain is disposed at or near the bottom of the collector box and wherein at least one upper collector box drain is disposed above the water level; a lower collector box drain line in communication with the lower connector box drain; an upper collector box drain line in communication with the upper collector box drain and disposed below the water level; a pump associated with the lower collector box drain line; a pump associated with the upper collector box drain line; at least one sensor located, preferably, outside the collector box and associated with a wall thereof, wherein the upper collection box drain line is disposed at a level just above the level of the sensor located outside the collector box, wherein the at least one sensor detects a grease/cooking fluid interface, and wherein the at least one sensor activates the pump associated with the upper drain line when the grease/cooking fluid level is detected to thereby remove the grease from the grease/cooking fluid.

Preferably, the apparatus also has at least one float inside the collector box having a density such that the float is disposed proximal the grease/cooking fluid interface, wherein the at least one sensor detects movement of the float, and wherein the at least one sensor activates the pump associated with the upper drain line when the float is detected so as to remove the grease from the grease/cooking fluid.

Another embodiment of the present disclosure provides a method for grease separation during a cooking cycle in a cooking device, in particular a commercial cooking device (such as, preferably, a combisteamer, a baking oven or a microwave oven) comprising a housing including a cooking chamber, a door for opening and closing the cooking chamber, and a drain having an opening for allowing cooking fluids/grease to drain from the cooking device, the method comprising: disposing a collector box having a bottom and a plurality of walls having a height disposed away from the bottom to form a collector box volume below the drain; placing a volume of water in the collector box volume to form a water level; disposing a drain pipe having a first end and a second end in association with both the drain and collector box, wherein the first end is disposed in association with the drain and in communication with the cooking chamber, wherein the second end is disposed in communication with the collector box volume, and wherein the second end is disposed below the water level so that the water level contacts and seals the second end; disposing at least one lower collector box drain at or near the bottom of the collector box in communication with the collector box volume, wherein the lower collection box drain has a lower collector box drain line in communication therewith; disposing at least one upper collector box drain above the water level, wherein the upper collection box drain has an upper collector box drain line in communication therewith, and wherein the upper collector box drain line is disposed below the water level; placing a pump in association with the lower collector box drain line; placing a pump in association with the upper collector box drain line; placing a sensor inside or outside the collector box, preferably outside the collector box and in contact with a wall thereof, wherein the upper collection box drain line is disposed at a level just above the level of the sensor located outside the collector box; allowing all the cooking fluids produced from a cooking food product to exit the cooking chamber through the drain pipe and into collector box; monitoring a cooking cycle of the cooking food product to determine a grease generation point therein; starting a grease separation cycle for the cooking device when the grease generation point is reached, wherein the grease separation cycle first substantially empties the collector box by pumping the cooking fluids from the collector box through the lower collector box drain line; stopping the pump associated with the lower collector box drain line; activating the sensor; allowing all the cooking fluids produced from a cooking food product to exit the cooking chamber through the drain pipe and into collector box; monitoring the grease level with the sensor; activating the upper drain line pump when the sensor detects a grease/cooking fluid interface; and removing grease from the collector box by pumping the grease from the collector box through the upper collector box drain line.

Preferably, the method also includes disposing at least one float inside the collector box, wherein the float has a density such that the float is disposed proximal the grease/cooking fluid interface, wherein the sensor detects movement of the float, and wherein the at least one sensor activates the pump associated with the upper drain line when the float is detected.

BRIEF DESCRIPTION OF THE DRAWINGS

Other and further objects, advantages and features of the present disclosure will be understood by reference to the following specification in conjunction with the accompanying drawings, in which like reference characters denote like elements of structure, wherein.

DETAILED DESCRIPTION OF THE DISCLOSURE

In the description that follows, like reference numbers will be used to designate like elements throughout the Figures.

Figure 1:
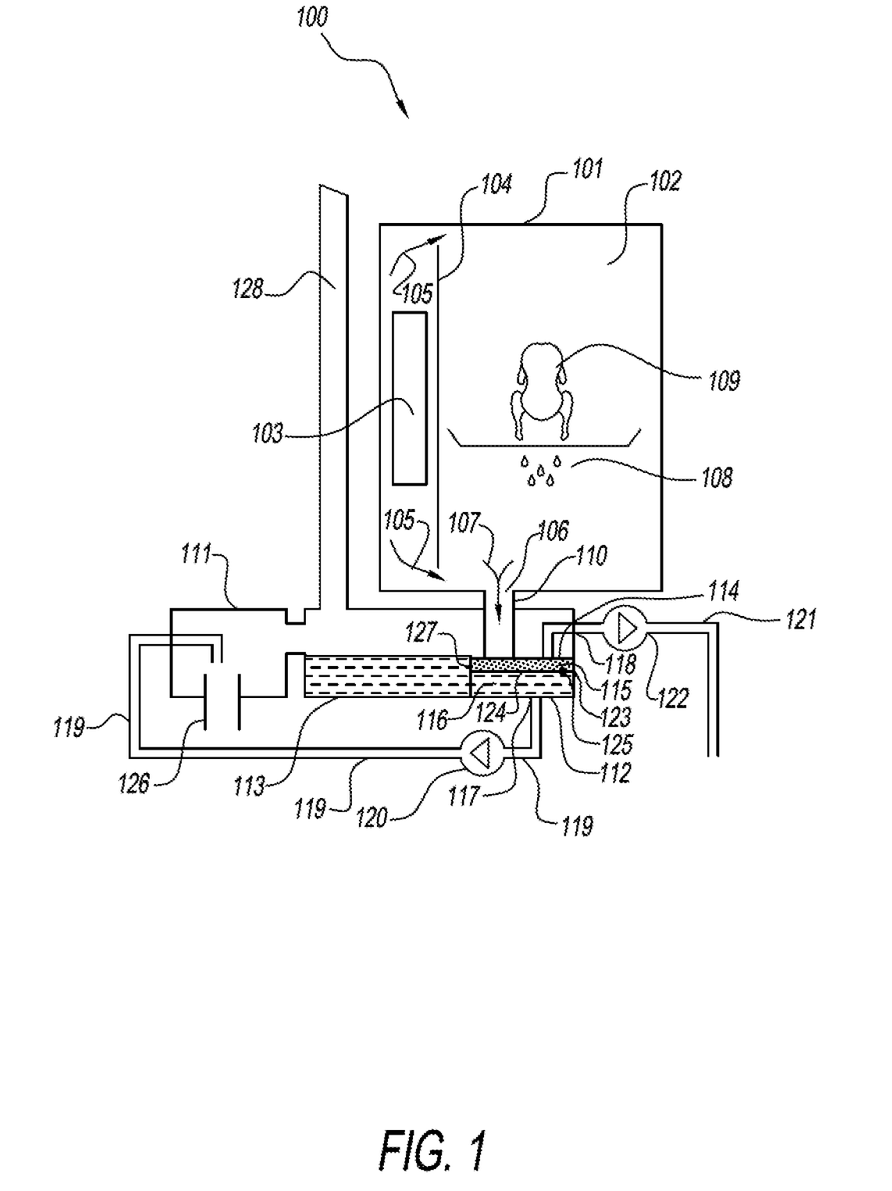
FIG. 1 is a schematic cross-sectional view of an overall system according to a preferred embodiment of the present disclosure.

FIG. 1 shows a schematic cross-sectional view of a generalized cooking system 100 according to the present disclosure. FIG. 1 does not depict a cooking cycle of a food product at any particular time during the cooking cycle, but is provided to show various elements and interactions therebetween for understanding other Figures in the present disclosure. Cooking system 100 includes an oven 101 having a cooking chamber 102. Associated with cooking chamber 102 is a fan 103 disposed behind a baffle plate 104. Surrounding fan 103 is a heating element (not shown) for heating air forced by fan 103 around the periphery of baffle plate 104 in directions indicated by the arrows 105. Also associated with fan 103 is, generally, one or more spray nozzles (not shown) for providing water to fan 103 and heating element (not shown). The combination of water, fan 103 and heating element provides steam to cooking chamber 102 during all or a portion of a cooking cycle, as is known to those of skill in the art. Due to the forced flow of air generated by fan 103 in the direction of arrows 105, the internal atmosphere of cooking chamber 102 is slightly over-pressured at this time and is forced through a drain 106 disposed in the bottom of cooking chamber 102 in the direction of arrows 107. The flow of air from fan 103 in the direction of arrows 105 around the ends of baffle 104 into cooking chamber 102 and then through drain 106 in the direction of arrows 107 also carries with it drippings 108 from a cooking food product 109 (shown in FIG. 1 as a chicken). During the portion of a cooking cycle when fan 103 is not operating and cooking chamber is not slightly over-pressured, drippings 108 still exit cooking chamber 102 via drain 106.

Disposed in association with drain 106 is a drain pipe 110 having two ends, a first end disposed in association with drain 106 and in communication with cooking chamber 102 and a second end disposed away from drain 106 and into a condenser 111. Condenser 111 is divided into a number of sections, including a collector box 112 and a reservoir 113.

Second end of drain pipe 110 is disposed in collector box 112 in contact with or below the surface of a fluid level 114 in collector box 112, thus providing a "closed" system, meaning that no atmospheric air enters cooking chamber 102. As shown during the state of the cooking cycle shown in FIG. 1, fluid level 114 is disposed in contact with second end of drain pipe 110, thus creating a "closed" system. Fluid level 114, at most points in the cooking cycle, is comprised of essentially two segments, a fat/grease segment 115 and a cooking fluid segment 116, both derived from drippings 108. As drippings 108 exit cooking chamber 102 through drain 106 and drain pipe 110, drippings 108 enter fluid level 114 in collector box 112 and into fat/grease segment 115 and cooking fluid segment 116 in collector box 112.

Associated with collector box 112 are two drains, a lower collector box drain 117 and an upper collector box drain 118. Associated with lower collector box drain 117 is a lower collector box drain line 119 and a lower collector box pump 120. Associated with upper collector box drain 118 is an upper collector box drain line 121 and an upper collector box drain pump 122. In the embodiment shown in FIG. 1, associated with an exterior wall of collector box 112 is a sensor 123 that detects the grease 115/cooking fluid 116 interface 124. Also shown in FIG. 1, according to a preferred embodiment of the present disclosure, is a float 125 that has a density such that it floats at the interface 124 of grease 115/cooking fluid 116. In FIG. 1, sensor 123 detects grease 115/cooking fluid 116 interface 124 by detecting float 125. As also shown in FIG. 1, lower collector box drain line 119 continues beyond lower collector box drain pump 120, enters into another segment of condenser 111 and is disposed in association with a waste pipe 126 to, e.g., a public sewer line (not shown). In FIG. 1, cooking chamber 102 is "closed" in the sense that no atmosphere can enter cooking chamber 102 through the vent pipe 128. This is accomplished due to fluid level 114 contacting and sealing second end of drain pipe 110. Also shown in FIG. 1 is a wall 127 disposed between collector box 112 and reservoir 113 to separate the contents thereof. The function of wall 127 will be discussed in more detail in conjunction with FIG. 2.

Figure 2:
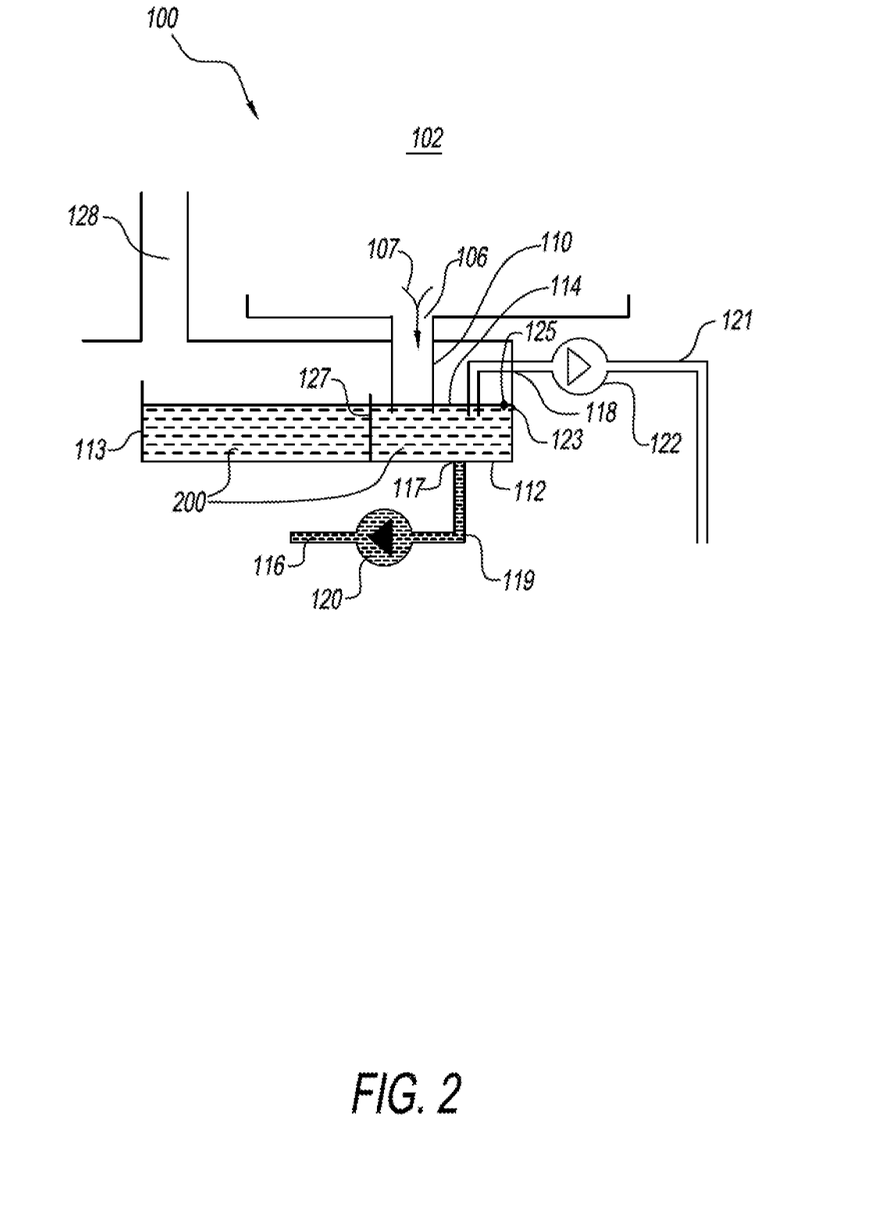
FIG. 2 is a schematic cross-sectional view of a collector box during the "closed" portion of a cooking cycle of a cooking device according to the present disclosure.

FIG. 2 shows the state of the cooking cycle in cooking system 100 at or near the beginning of a cooking cycle as well as during the cooking cycle until a grease separation cycle is commenced. At the beginning of a cooking cycle, collector box 112 and reservoir 113 are filled with water 200. As the cooking cycle progresses, the content of collector box 112 begins to contain a small amount of grease 115 and a predominant amount of cooking fluids 116 that are separated, as shown in FIG. 1, at grease 115/cooking fluid 116 interface 124. As a cooking cycle continues, collector box volume increases and there is a "spillover" from collector box 112 to reservoir 113, while the system remains "closed". As shown also in FIG. 2, lower collector box drain line 119 is filled with cooking fluid 116 due to the fact that lower collector drain line is open into collector box 112. In FIG. 2, sensor 123 does not detect float 125 (floating at the top of water level 200) because the grease separation cycle has not been initiated and sensor 123 has not been activated.

Figure 3:
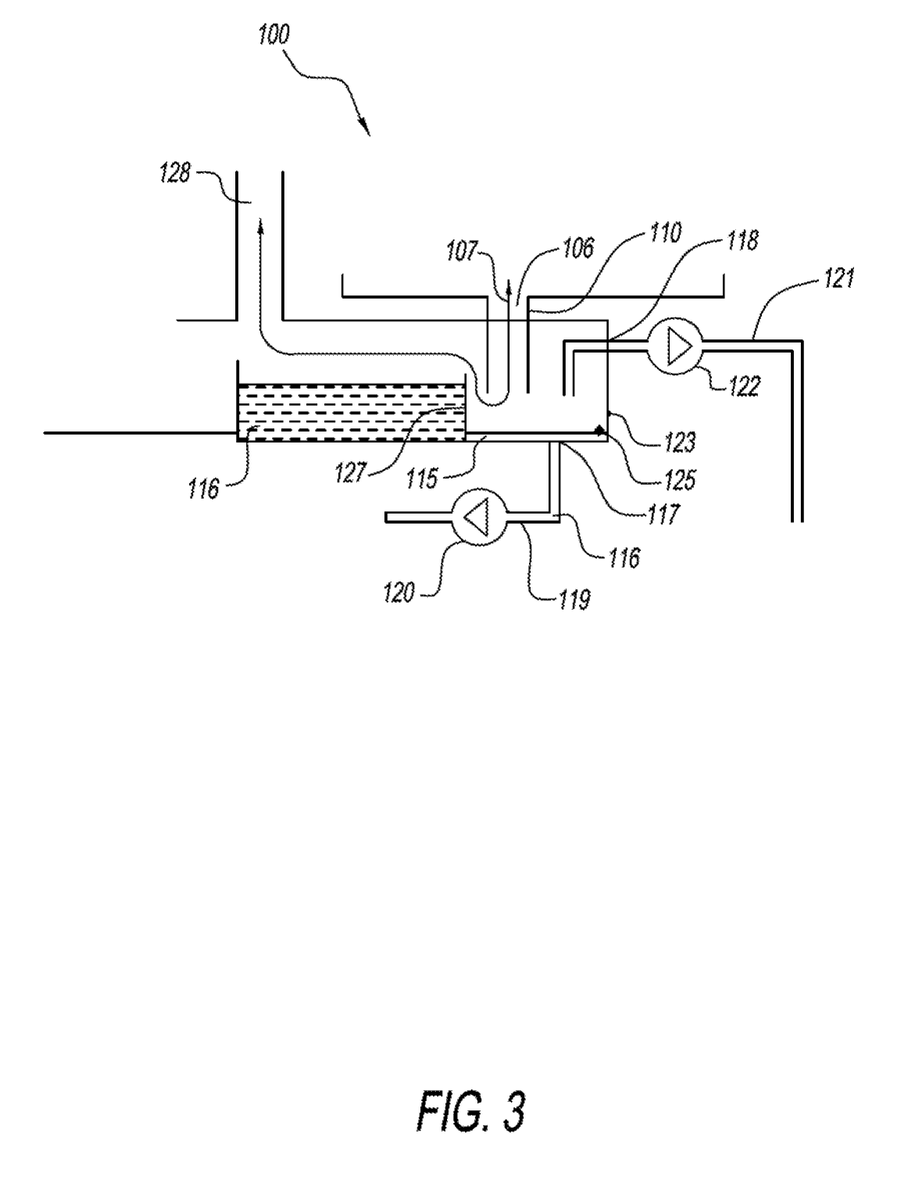
FIG. 3 is a schematic cross-sectional view of a collector box at the beginning of the start of a grease separation cycle in an "open" portion of a cooking cycle of a cooking device according to the present disclosure.

FIG. 3 shows a cross-sectional view of FIG. 2 immediately after the grease separation cycle has commenced. The point in time when a grease separation cycle is commenced during a cooking cycle is known based upon the food product being cooked and the parameters of the cooking cycle, such that the point in time during the cooking cycle of a food product (such as chicken) when drippings 108 will contain predominately, if not entirely, grease 115 is known. The point in time during a cooking cycle when drippings 108 will contain predominately, if not entirely, grease 115 can be programmed into a controller (not shown) of the cooking device. When the cooking cycle reaches the point when grease generation will predominate, the grease separation cycle can be automatically commenced. Of course, the grease separation cycle can be commenced manually as well. At the start of a grease separation cycle, controller (not shown) causes lower collector box pump 120 to be activated for a certain time so as to empty collector box 112 of, predominately, cooking fluids 116. After the certain time sufficient to empty collector box 120 of predominantly cooking fluids 116 and a small amount of grease 115 (also controlled by controller), lower collector box pump 120 is deactivated and cooking fluids begin to collect again in collector box 112. At this time, it can be seen that fluid level 114 is below second end of drain pipe 110 such that cooking system 110 is now "open". In the "open" configuration, atmosphere can enter cooking chamber 102 via vent pipe 128, as shown in the bidirectional flow of air shown by arrow 107. All drippings 108 now fall into collector box 112, with drippings 108 comprising predominately, if not entirely, grease 115. From the configuration of cooking system 100 shown in FIG. 3 the grease separation cycle continues as shown in FIG. 4.

Figure 4:
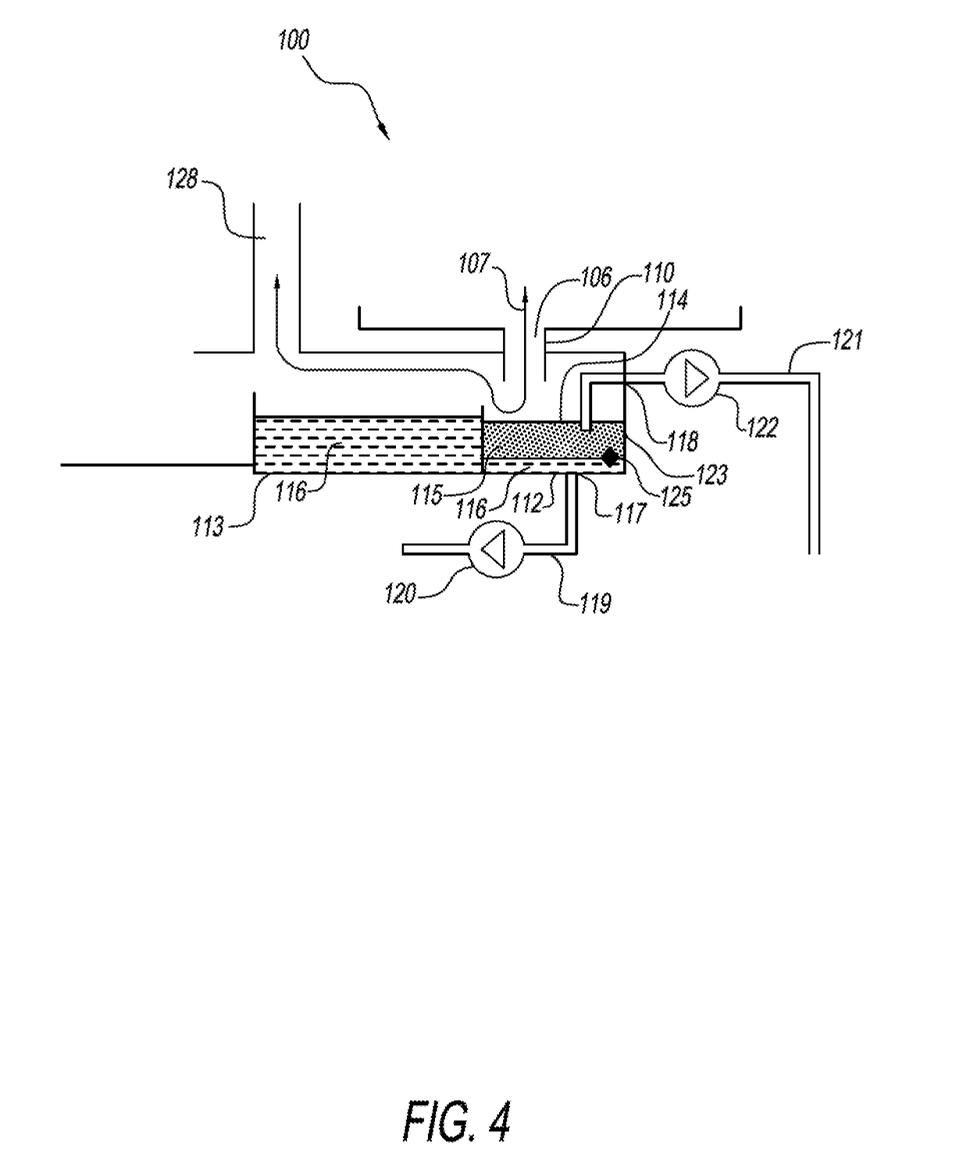
FIG. 4 is a schematic cross-sectional view of a collector box during a grease separation cycle of a cooking cycle of a cooking device according to the present disclosure.

FIG. 4 shows cooking system 100 in the state of a cooking cycle when grease removal from collector box 112 is about to begin. As seen in FIG. 4, float 125 is approaching sensor 123. As float 125 reaches sensor 123, sensor 123 activates upper collector box pump 122. The pumping action of upper collector box pump 122 removes grease 115 floating on the top of cooking fluids 116. Although not drawn to scale, the end of upper collector box drain line 118 that is disposed below fluid level 114 is, preferably, disposed just above the level of sensor 123 such that the action of upper collector box pump 122 removes substantially all grease 115 from collector box 112. The level of grease 115 does not reach second end of drain pipe 110 such that removal of grease 115 maintains cooking system 100 in an "open" configuration. The activation of upper collector box pump 122 can be such that upper collector box pump 122 remains in continual operation, or controller can be programmed to "pulse" operation of upper collector box pump 122 so that it operates in a cyclic manner. Generally, once the grease separation cycle has begun for a particular cooking food product, upper collector box pump remains in operation, either continually or "pulsed", until the end of the cooking cycle.

In the manner shown according to the methods of operation of the grease separation apparatus in FIGS. 1-4, a large percentage of grease 115 can be separated and removed from cooking system 100 during a cooking cycle. In the embodiments shown and described with respect to FIGS. 1-4, sensor 123 has been described as a sensor (such as a reed sensor) that detects float 125. However, sensor 123 can be, optionally, an optical density sensor, a light diffusion sensor or other type of sensor that can distinguish between the optical quality and/or the light transmission characteristics between substantially aqueous media such as cooking fluids 116, and substantially oil/grease media such as grease 115. In these latter situations, float 125 is not necessary because sensor 123 alone can detect grease 115/cooking fluids 116 interface 124 and activate upper collector box pump 122. Alternatively, the sensor 123 can be of the resistive type since grease and cooking fluid have different conductance values, as is known to those of skill in the art.

Figure 5:
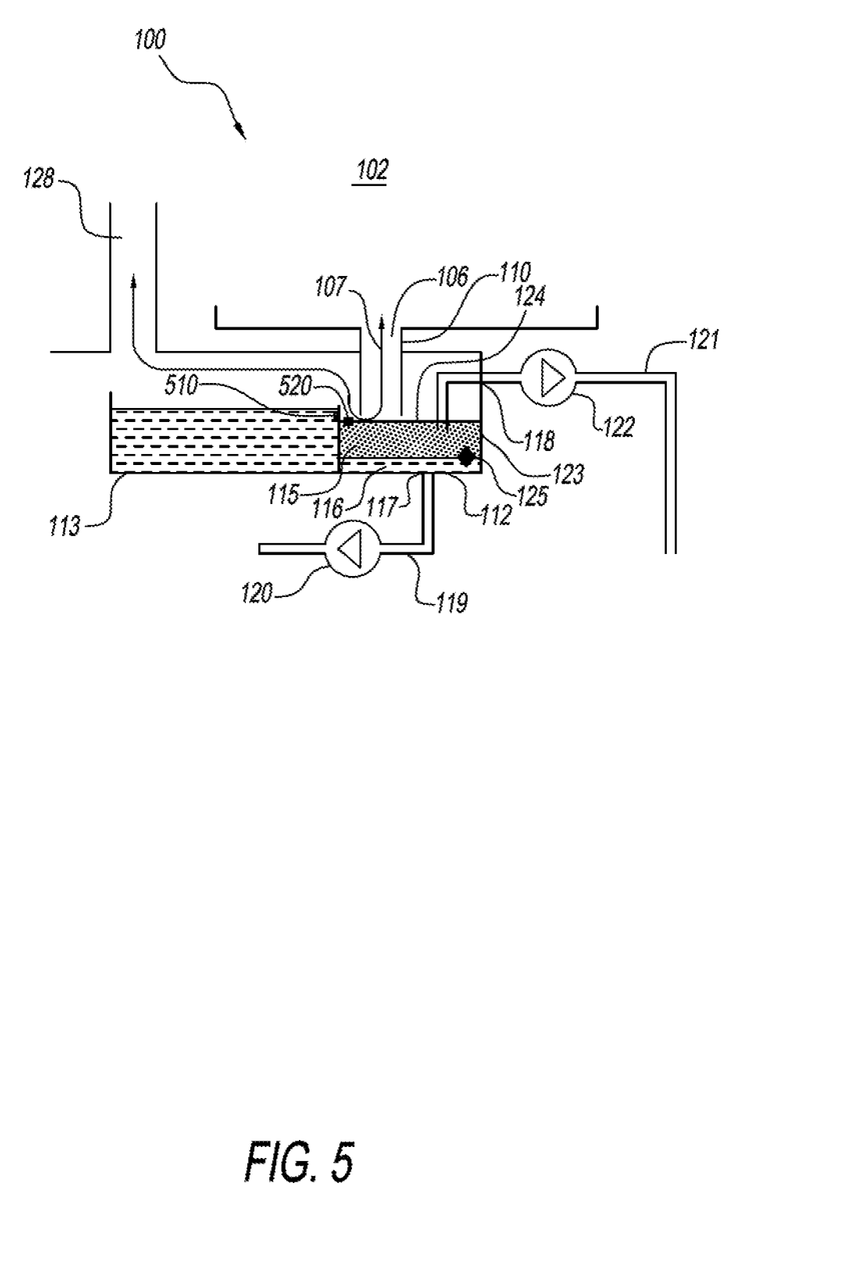
FIG. 5 is a schematic cross-sectional view of a collector box with two external sensors and two internal floats according to an alternate embodiment of a grease collection apparatus of a cooking device according to the present disclosure.

FIG. 5 shows an alternative embodiment of the present disclosure. As shown in FIG. 5, collector box 112 has sensor 123 positioned adjacent to collector box 112 on one side and float 125 of such a density that it is positioned at the interface of grease 115/cooking fluid 116. Also shown in FIG. 5 there is a second sensor 510 and a second float 520 that is of such a density that float 520 sits on the surface of grease 115. Second sensor 510 can be positioned in reservoir 113 if sensor 510 is waterproof. Alternatively, sensor 510 can be positioned at a different location outside of reservoir 113 in a dry area, as will be apparent to those of skill in the art. Using two floats 125, 520 and two sensors 123, 510 allows for automatic starting and stopping of the lower collector pump 120 and the upper collector box pump 122 in the following manner, so that the purity of the separated grease will be increased as drippings 108 that contain predominately grease and a lesser amount of cooking fluids can segregate (due to different densities). At the start of a grease separation cycle, sensors 123 and 510 are activated. As float 520, floating on the surface of grease 115, reaches sensor 510, upper collector box pump 122 is activated by sensor 510, causing grease 115 to be pumped out of collector box 112. As the level of grease 115/cooking fluids 116 interface 124 rises due to the segregation of grease 115 and cooking fluid 116, float 125 approaches sensor 123. In the embodiment shown in FIG. 5, as float 125 reaches sensor 123, sensor 123 activates lower collector box pump 120 and pumps cooking fluid into the drain. Thereafter, drippings 108 comprised primarily of grease 115, but also some cooking fluids 116, again fill collector box 112. Continuing, as drippings 108 again fill collector box 112, float 520 on the surface of grease 115 approaches sensor 510 and, when float 520 reaches sensor 510, upper collector box pump 122 is again activated removing the additionally collected grease 115. In this manner, the embodiment according to FIG. 5 provides for automatic starting and stopping of upper collector box pump 122 to remove primarily grease 115 from collector box 112. In an alternative to the foregoing, sensor 123 and float 125 can be positioned and operate as described with respect to the embodiment shown in FIG. 4. At the same time, float 520 can again be chosen so as to float on the surface of grease 115, but sensor 520 can be positioned at a level just higher than sensor 123. In this embodiment, when float 125 reaches sensor 123, upper collector pump 122 is activated to remove primarily grease from collector box 112. However, when float 510 reaches sensor 520 due to the lowering level of grease 115, sensor 520 deactivates upper collector box pump 122. Again, the use of two sensors and two floats serves to automatically activate and deactivate upper collector box pump 122.

Figure 6A:
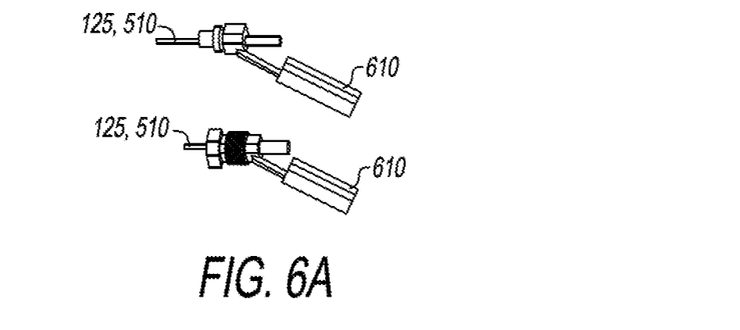
FIGS. 6A and 6B show two embodiments of floats the can be used in the alternate embodiment of a grease separation apparatus of a cooking device according to the present disclosure as shown in FIG. 5.
Figure 6B:
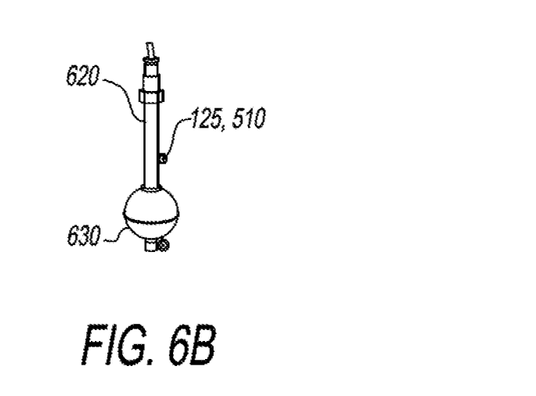

FIGS. 6A and 6B show two alternative float configurations. FIG. 6A shows floats 125, 510 mounted on a rotation element 610 such that float 125, 510, will remain at grease 115/cooking fluids 116 interface 124 or on the surface of grease 115. FIG. 6B shows float 125, 510 mounted on a vertical bar 620 at an adjustable distance above buoyancy device 630. Rotation element 610 and buoyancy device 630 are capable of having defined specific gravities such that they will float on cooking fluids 116 but not on the surface of grease 115 or, optionally, of a defined specific gravity that will float on the surface of grease 115.

Figure 7:
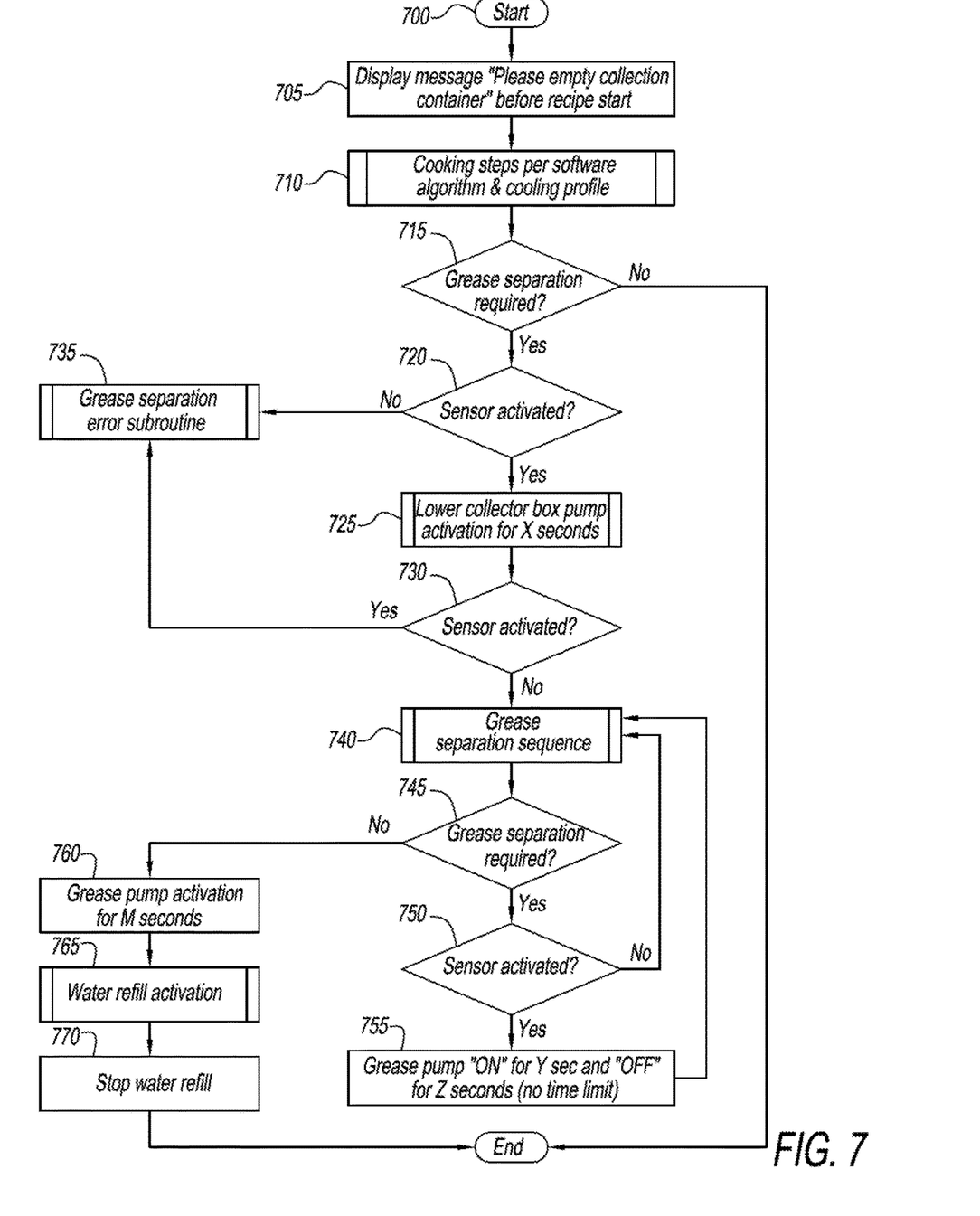
FIG. 7 shows a flow chart of a grease separation method according to the present disclosure.

FIG. 7 shows a flowchart of an example of the process according to the present disclosure. As shown in FIG. 7, in step 700 a cooking cycle that will include a grease separation cycle is commenced. As the cooking cycle is commenced in step 700, a display message is shown in step 705 on a display/interface (that is not shown in any of the Figures, but is common in cooking systems 100, as is well-known to those of skill in the art) to empty the grease collection container(s) (not shown in any of the Figures). As grease is pumped from collector box 112 by upper collector box pump 122, grease 115 is disposed in one or more grease collection container(s). In step 710, the cooking cycle includes cooking steps that are controlled according to a cooking algorithm/software that is embodied in or controlled by controller, as is common in the art. The cooking cycle indicated in step 710 includes, among other things, a cooking profile (time, temperature, steam generation portions, etc.) that also includes an indication of the point in the cooking cycle during which grease generation will predominate from the cooking food product and drippings 108 will comprise predominately, if not entirely, grease 115. The controller can be configured/programmed to automatically commence a grease separation cycle when the grease generation point is reached, or can provide an indication (visually on the display/interface or audibly, or both) so that an operator may commence the grease separation cycle manually. Step 715 is a decision point that asks the question: "Is grease separation required?" The answer to this question can, as described above, either be automatically controlled by the controller as part of the cooking profile, or can be answered by the operator responding to an indication on the display/interface so that the operator can manually commence the grease separation cycle. If grease separation is required the answer to the question presented in step 715 is "YES", and the process progresses to step 720. In step 720, the question is asked: "Is the sensor activated?" If sensor 123 is activated, the process continues to step 725 and lower collection box pump 120 is activated for a finite period of time (X seconds; controlled by the controller) sufficient to empty collector box 112, as shown in FIG. 3. The collector box 112 should be emptied after X seconds, and sensor 123 should be deactivated. After X seconds as indicated in step 725, decision point 730 is reached and the question is again asked: "Is the sensor activated?" If the answer to this question after X seconds is "YES", then the process proceeds to step 735, which indicates that there is an error in the grease separation cycle, and a notification may be provided (visually on the display/interface or audibly, or both). An error can include, e.g., a problem with lower collection box pump 120, or a problem with sensor 123. If an error is detected and indicated, the operator will take appropriate steps to rectify the error. Once the error is corrected, the process can be resumed, for example to step 715. If the error is not or cannot be corrected the process returns to step 735 and the error indication is repeated or maintained, as the case may be. Similarly, in step 720 where the decision point question "Is the sensor activated?" is asked after an indication of grease separation being required, if the answer is "NO", then the process once again proceeds to step 735 due to there being some error in either sensor 123 or, if used, float 125. Continuing, if at decision point 730 the answer to the question "Is the sensor activated?" is "NO", then the process proceeds to step 740, the grease separation sequence, and the grease separation sequence in step 740 proceeds to decision point 745, in which the question is again asked: "Is grease separation required?" If the answer to this question is "YES" (it will be apparent that for the first time decision point 745 is reached and the question is asked, the answer is always "YES"), the process proceeds to step 750, another decision point, where the question is asked: "Is the sensor activated?" If the answer to the question asked at decision point 750 is "YES", then the process proceeds to step 755 in which upper collection box pump 122 is turned on for Y seconds and then turned off for an undefined amount of time (indicated as "Z" seconds in FIG. 7). From step 755, the process cycles back to step 740, the grease separation sequence, and continues as described above. In this manner, so long as sensor 123 is activated when decision point 750 is reached, upper collection box pump 122 will continue to cycle to remove grease 115. If, when decision point 750 is reached after step 745, the answer to the question "Is the sensor activated?" is "NO", then the process similarly returns to grease separation sequence 740. In decision point step 745, if the answer to the question "Is grease separation required?" is "NO", the process proceeds to step 760, in which the upper collector box pump 122 is activated for M seconds so as to remove the final amount of grease 115. After the passage of M seconds, the process proceeds to step 765, which, as indicated, activates water refill of collector box 112 so as to again seal second end of drain pipe 110. Water refill step 765 is timed so as to sufficiently fill collector box 112 to seal second end of drain pipe 110. Thereafter, in step 770, water refill of collector box 112 is stopped and the end 775 of the cooking cycle is reached.

Figure 8:
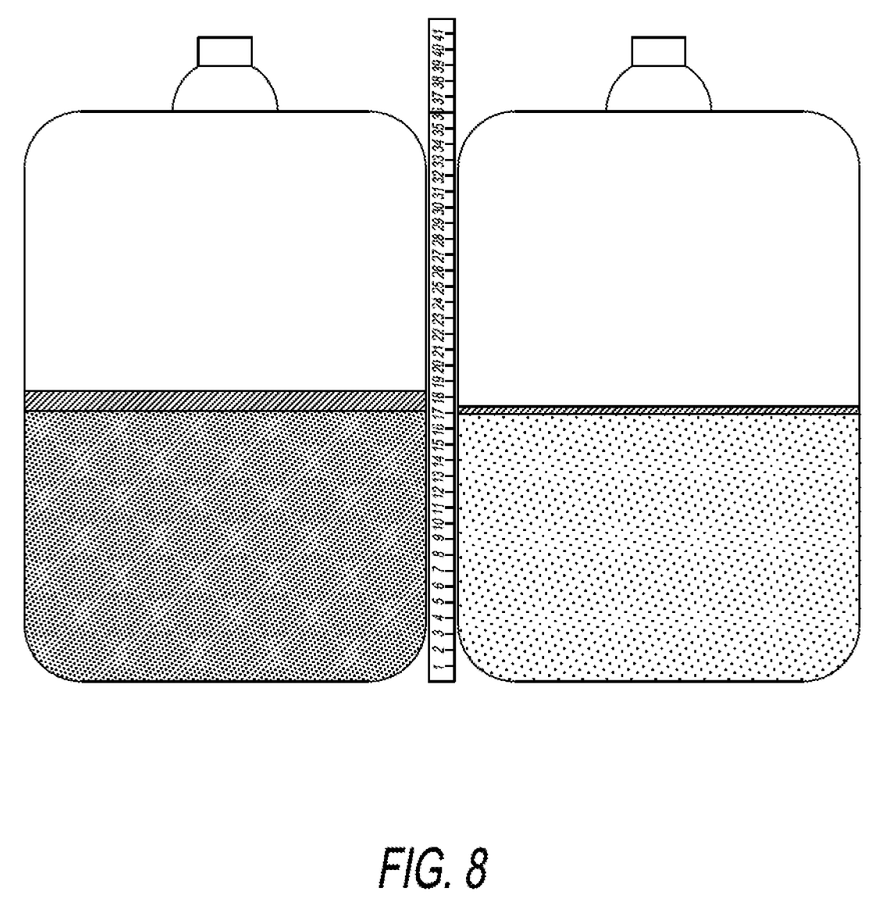
FIG. 8 shows the effectiveness of grease separation using an apparatus and method according to U.S. Patent Publication No. 2013/0133638.

FIG. 8 shows the effectiveness of grease separation using an apparatus and method according to U.S. Patent Publication No. 2013/0133638. In FIG. 8, the method and apparatus according the patent publication was performed using a chicken cooking cycle of 35 min. at a temperature of about 90° C. The wastewater that, according to the patent publication, should contain no grease in fact had grease contamination in it. As shown on the right side of FIG. 8, there was approximately 11 L of wastewater collected during the 35 min. cooking cycle. The grease contained in the wastewater was approximately 200 ml (indicated by the volume outlined at "B"). Shown on the left side of FIG. 8 is the grease separation quantity that, according to the patent publication, should contain at least predominately, if not only, grease. In fact, the grease separation portion obtained from the grease separation chamber also contained approximately 11 L of fluid, which was predominately cooking fluid and a small proportion of grease, approximately 400 ml (indicated by the volume outlined at "A"). It should be noted that these volumes of grease are approximated, and true measurements could change the foregoing volumes of grease. Thus, the method and apparatus according to the above patent publication was not very effective in actually "separating" grease from cooking fluids. This was to be expected due to the incorrect presumption on which the grease separation methodology of the Patent Publication No. 2013/0133638 is based, i.e., that only grease would fall into the grease collection reservoir, and that all and only cooking fluid would carry over the barrier wall in the closed system.

Figure 9:
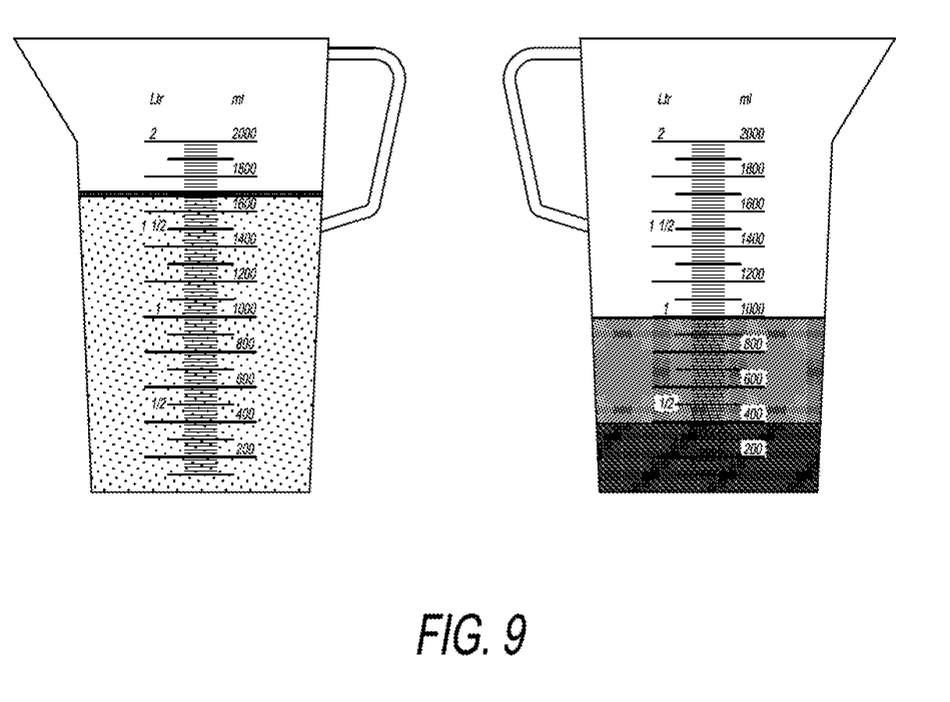
FIG. 9 shows the effectiveness of grease separation using an apparatus and method according to the present disclosure.

FIG. 9 shows the effectiveness of grease separation using an apparatus and method according to the present disclosure. On the left side of FIG. 9, the wastewater drained at the beginning of the grease separation cycle (i.e., step 725 in FIG. 7) shows approximately 1720 mL of wastewater collected, of which only about 40 mL is grease (indicated by the volume outlined at "A"). On the right side of FIG. 9, the content of collector box 112 removed by upper collector box pump 122 in the grease separation steps 755, 760 of FIG. 7 is shown. As can be seen, approximately 980 mL of liquid was removed which was essentially pure grease having two different densities. Thus, the results in FIG. 9 show that the quantity of grease removed during the grease separation step according to the method and apparatus of the present disclosure was much greater than the quantity that remained in the wastewater collected at the beginning of the grease separation cycle (shown in the left side of FIG. 9) by a factor of about 25. Also, the comparison of the results shown in FIGS. 8 and 9 establish that the grease separation methods and apparatuses of the present disclosure are far superior to that of U.S. Patent Publication No. 2013/0133638, the closest prior art.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents, patent publications and other references referred to above are incorporated herein by reference for all that they contain as if the contents thereof have been fully set forth verbatim herein.

What is claimed is:

1. An apparatus for grease separation during a cooking cycle in a cooking device comprising a cooking chamber, a door for opening and closing the cooking chamber, and a drain disposed in the cooking chamber and having an opening for allowing cooking fluids/grease to drain from the cooking chamber, the apparatus comprising:

a condenser disposed below and external to the cooking chamber, wherein the condenser is comprised of a bottom, two side walls, and a middle wall disposed between the two side walls and connected to the bottom, thereby forming a collector box and a reservoir, wherein the collector box contains a quantity of fluid having a fluid level, and wherein fluid passes from the collector box to the reservoir by passing over the middle wall;

a drain pipe having a length disposed in communication with the drain, wherein the drain pipe has a first end and a second end, wherein the first end and the second end are disposed at opposite ends of the length, wherein the first end is disposed in communication with the cooking chamber, wherein the second end is disposed in communication with the collector box, and wherein the second end contacts and is sealed by the fluid level to form a closed system wherein atmospheric air cannot enter the cooking device;

a lower collector box drain line in communication with a lower collector box drain disposed in the bottom of the collector box, wherein the lower collection box drain line is disposed below the bottom of the collector box;

at least a first sensor connected to the middle wall or the side wall of the collector box, wherein the at least first sensor detects a grease/cooking fluid interface in the collector box;

an upper collector box drain line having an open end disposed in communication with an upper collector box drain, wherein the open end is disposed above the fluid level in the collector box and above the at least first sensor; and at least a first float disposed in the collector box having a density such that the at least first float is disposed proximal the grease/cooking fluid interface, wherein the at least first sensor detects the grease/cooking fluid interface by detecting the at least first float.

2. The apparatus for grease separation according to claim 1, further comprising a pump associated with the lower collector box drain line and a pump associated with the upper collector box drain line.

3. The apparatus for grease separation according to claim 2, further comprising a controller, wherein the controller activates the pump associated with the lower collector box drain line at the beginning of a grease separation cycle.

4. The apparatus for grease separation according to claim 1, wherein the at least first sensor activates the pump associated with the upper collector box drain line when the at least first float is detected so as to remove grease from the grease/cooking fluid.

5. The apparatus for grease separation according to claim 1, further comprising at least a second float disposed in the collector box and at least a second sensor connected to the middle wall or the side wall of the collector box for detecting the second float.

6. The apparatus for grease separation according to claim 5, wherein the at least second float has a density such that the at least second float is disposed on the surface of the grease in the grease/cooking fluid.

7. The apparatus for grease separation according to claim 6, wherein, when the at least second sensor detects the at least second float, the upper collector box pump is activated, and wherein, when the at least first sensor detects the at least first float, the lower collector box pump is activated.

\* \* \* \* \*